(12) United States Patent
Campton et al.

(10) Patent No.: US 10,451,122 B2
(45) Date of Patent: Oct. 22, 2019

(54) MULTI-MODE CLUTCH SYSTEM WITH SLIDING CAM PROFILES

(71) Applicant: BorgWarner Inc., Auburn Hills, MI (US)

(72) Inventors: Calahan Campton, Royal Oak, MI (US); John F. Guzdek, Clarkston, MI (US); Jennifer Kadlec, West Bloomfield, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/565,920

(22) PCT Filed: Apr. 6, 2016

(86) PCT No.: PCT/US2016/026162
§ 371 (c)(1),
(2) Date: Oct. 12, 2017

(87) PCT Pub. No.: WO2016/168020
PCT Pub. Date: Oct. 20, 2016

(65) Prior Publication Data
US 2018/0094676 A1      Apr. 5, 2018

Related U.S. Application Data

(60) Provisional application No. 62/147,442, filed on Apr. 14, 2015.

(51) Int. Cl.
*F16D 41/14* (2006.01)
*F16D 23/12* (2006.01)
*F16D 41/16* (2006.01)

(52) U.S. Cl.
CPC .............. *F16D 41/14* (2013.01); *F16D 41/16* (2013.01); *F16D 2023/123* (2013.01)

(58) Field of Classification Search
None
See application file for complete search history.

(56) References Cited

U.S. PATENT DOCUMENTS 2,708,990 A * 5/1955 Cudosky .............. A01B 33/028
                                                          192/43.1
5,992,592 A * 11/1999 Showalter ............... F16D 41/16
                                                          192/43.1
(Continued)

FOREIGN PATENT DOCUMENTS

JP    2005/249115 A    9/2005
JP    2010/071419 A    4/2010

OTHER PUBLICATIONS

International Search Report related to PCT Application No. PCT/US2016/026162 dated Jul. 28, 2016.

*Primary Examiner* — Mark A Manley
(74) *Attorney, Agent, or Firm* — Miller, Matthias & Hull LLP

(57) ABSTRACT

A multi-mode clutch system (10) may include a cam slider (66) operatively associated with an actuator (82). A first cam profile (70) and a second cam profile may both be operatively associated with the cam slider (66). A first pawl (26) may be operatively associated with the first cam profile (70) and a second pawl may be operatively associated with the second cam profile (74) wherein the first cam profile (70) selectively acts on the first pawl (26), the second cam profile (74) selectively acts on the second pawl (30), and the multi-mode clutch system (10) is configured to allow multiple modes of operation between the first and second pawls (26, 30) and an inner race (14) according to different actuator (82) positions.

14 Claims, 5 Drawing Sheets

(56) References Cited

U.S. PATENT DOCUMENTS

| | | | |
|---|---|---|---|
| 8,042,669 B2 * | 10/2011 | Samie | F16D 41/12 |
| | | | 192/43.1 |
| 8,267,231 B2 * | 9/2012 | Holmes | B60K 6/50 |
| | | | 192/43.1 |
| 2007/0278061 A1 * | 12/2007 | Wittkopp | F16D 41/16 |
| | | | 192/43.1 |
| 2008/0000747 A1 | 1/2008 | Saka | |
| 2014/0305761 A1 | 10/2014 | Kimes | |

* cited by examiner

MULTI-MODE CLUTCH SYSTEM WITH SLIDING CAM PROFILES

CROSS-REFERENCE TO RELATED APPLICATION

This application is an International Patent Application claiming priority under 35 U.S.C. § 119(e) to U.S. Provisional Patent Application No. 62/147,442 filed on Apr. 14, 2015.

TECHNICAL FIELD

This disclosure generally relates to clutches and, more particularly, relates to a multi-mode clutch assembly.

BACKGROUND OF THE DISCLOSURE

An automotive vehicle typically includes an internal combustion engine containing a rotary crankshaft configured to transfer motive power from the engine through a driveshaft to turn the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuate clutch units adapted to dynamically shift among variously available gear ratios without requiring driver intervention. Pluralities of such clutch units, also called clutch modules, are incorporated within such transmissions to facilitate the automatic gear ratio changes.

Moreover, the transmission may incorporate numerous sets of gears and the various gears may be structurally comprised of sun gears, intermediate gears such as planet or pinion gears supported by carriers, and outer ring gears. Specific transmission clutches may be associated with specific sets of the selectable gears within the transmission to facilitate the desired ratio changes.

For example, one of the clutch modules of an automatic transmission associated with first (low) and reverse gear ratios may be normally situated at the front of the transmission and closely adjacent the engine crankshaft. The clutch module may include a driving member and a driven member which may be disposed circumferentially about the driving member. The driving and driven members may be configured to operate in multiple modes and, in one non-limiting example, the driving member may be drivingly rotatable in only one direction, however, other modes may be possible. Alternatively or additionally, the driving member may be drivingly rotatable in a plurality of directions. Moreover, the driving member may be selectively locked to the driven member via an engagement mechanism such as a roller, a sprag, a pawl, or other known engagement mechanisms. Furthermore, the rotation of the driving member may be effective to directly transfer rotational motion from the engine to the driveline.

In some transmission systems, the driven member may be fixed to an internal case or housing of an associated planetary member of the automatic transmission. Under such circumstances, in a first configurational mode, the driving member may need to be adapted to drive in one rotational direction, but freewheel in the opposite direction, in a condition referred to as overrunning. Those skilled in the art will appreciate that overrunning may be particularly desirable under certain operating states, such as when a vehicle is traveling downhill or coasting. Under such circumstance, the driven member may occasionally have a tendency to rotate faster than the driving member. Allowing the driving member to overrun the driven member may provide protection against damage to the engine and/or transmission components.

In a second non-limiting mode, such as when a vehicle may be in reverse gear, the engagement mechanisms may be adapted for actively engaging in both rotational directions of the driving member, thus not allowing for an overrunning condition in either direction.

SUMMARY OF THE DISCLOSURE

In accordance with one aspect of the present disclosure, a multi-mode clutch system is provided. The multi-mode clutch system may include a cam slider operatively associated with an actuator. A first cam profile and a second cam profile may both be operatively associated with the cam slider. A first pawl may be operatively associated with the first cam profile and a second pawl may be operatively associated with the second cam profile wherein the first cam profile selectively acts on the first pawl, the second cam profile selectively acts on the second pawl, and the multi-mode clutch system is configured to allow multiple modes of operation between the first and second pawls and an inner race, according to different actuator positions.

In accordance with another aspect of the present disclosure, a multi-mode clutch system is provided. The multi-mode clutch system may include a cam slider operatively associated with an actuator. An inner slider may be operatively associated with the cam slider. A prevention spring may be disposed between the inner slider and the cam slider. A first cam profile may be disposed on one of the cam slider and the inner slider. A second cam profile may be disposed on the other one of the cam slider and the inner slider. A first pawl may be operatively associated with one of the first cam profile and the second cam profile. A second pawl may be operatively associated with the other one of the first cam profile and the second cam profile wherein one of the first cam profile and the second cam profile selectively acts on the first pawl, the other one of the first cam profile and the second cam profile selectively acts on the second pawl, and the multi-mode clutch system is configured to allow multiple modes of operation between the first and second pawls and an inner race, according to different actuator positions.

In accordance with a further aspect of the present disclosure, a method of operating a multi-mode clutch system is provided. The method may entail the step of operating an actuator, a cam slider, a first pawl, and a second pawl of the multi-mode clutch system. Another step may be selectively positioning the cam slider in a first position via the actuator such that the first and the second pawls are in locked position with an inner race of the multi-mode clutch system. Yet another step may be selectively positioning the cam slider in a second position via the actuator such that the first pawl is in open position with respect to the inner race and the second pawl is in locked position with the inner race. Yet a further step may be selectively positioning the cam slider in a third position via the actuator such that the first and second pawls are in open position with respect to the inner race.

These and other aspects and features will be better understood when reading the following detailed description in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

Figure 1:
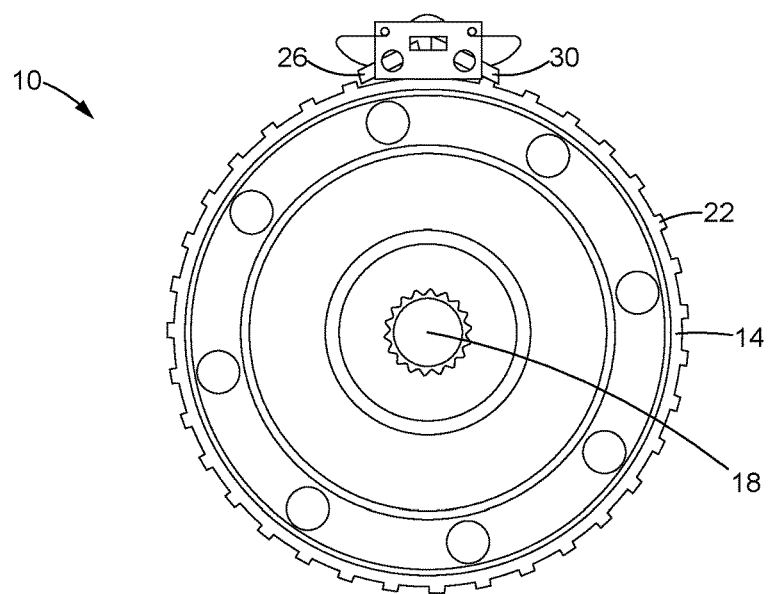
FIG. 1 is a side view of a clutch assembly constructed in accordance with the present disclosure.
Figure 2:
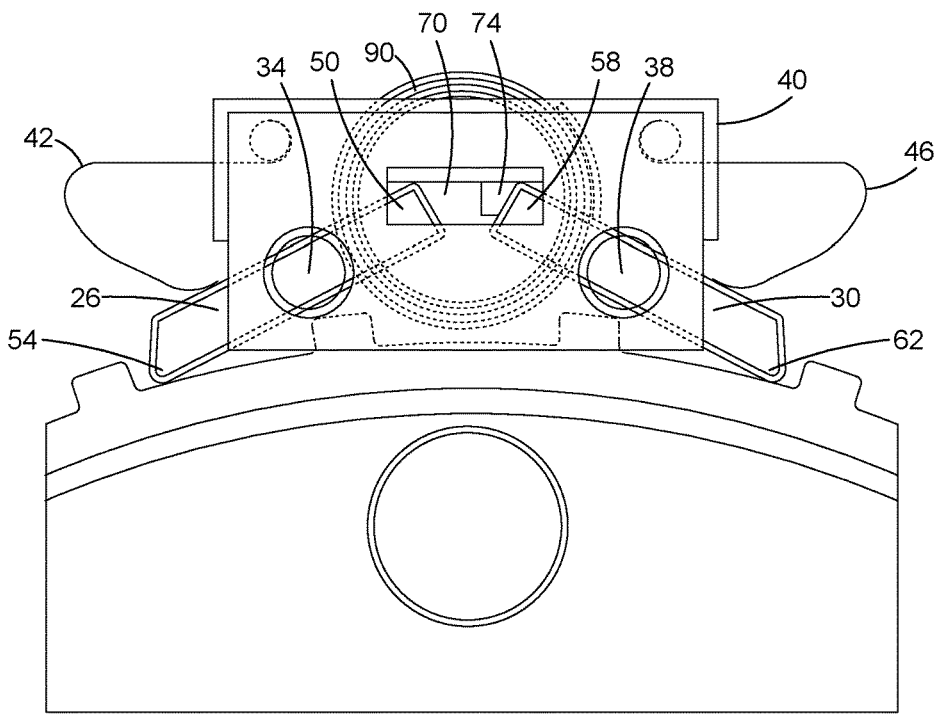
FIG. 2 is another side view of the clutch assembly of FIG. 1 constructed in accordance with the present disclosure.
Figure 3:
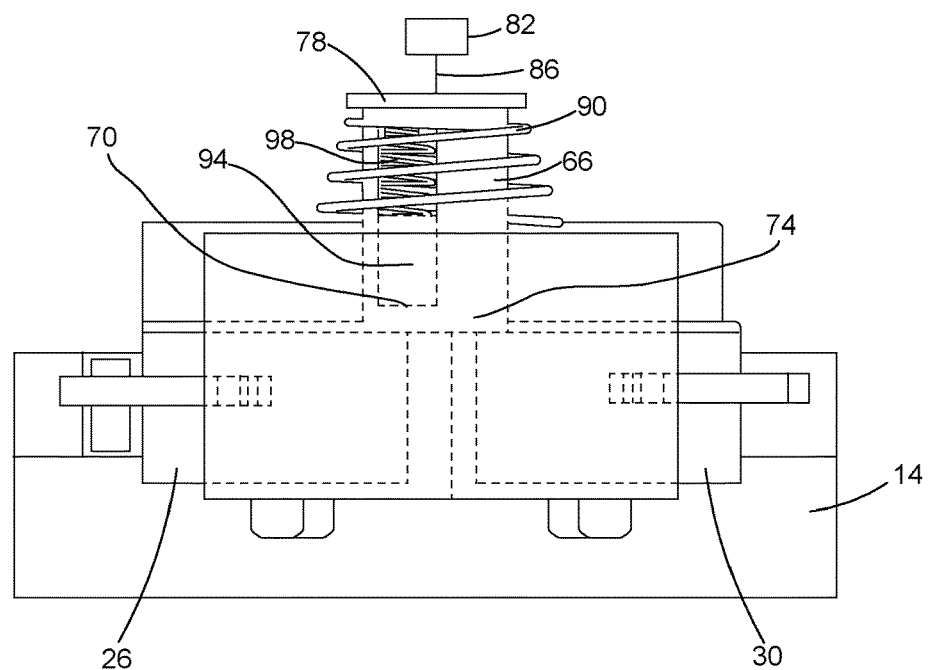
FIG. 3 is a top view of the clutch assembly of FIG. 1 constructed in accordance with the present disclosure.
Figure 4:
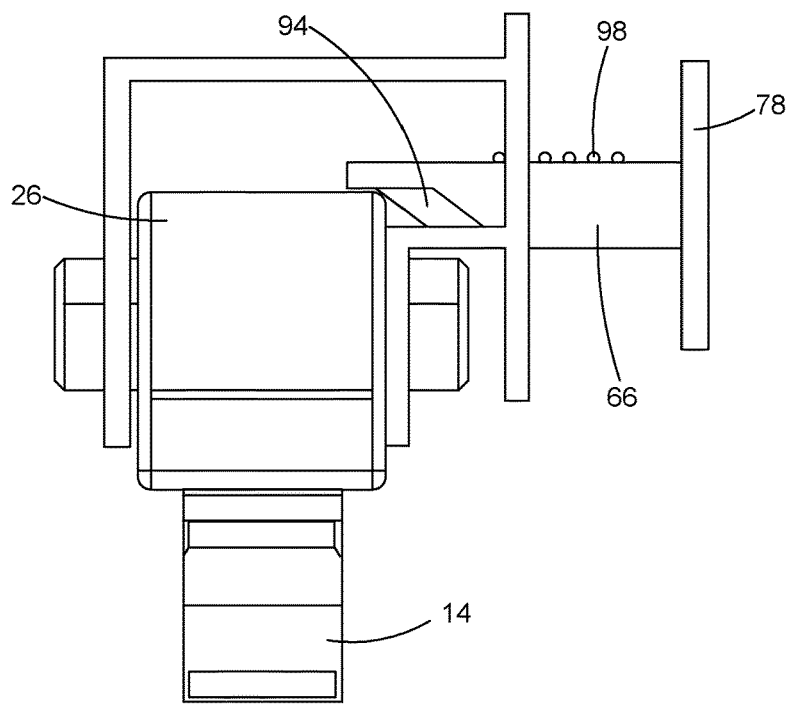
FIG. 4 is a front view of the clutch assembly of FIG. 1 constructed in accordance with the present disclosure.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Turning now to the drawings, and with specific reference to FIGS. 1-4, a clutch system constructed in accordance with the present disclosure is generally referred to by reference numeral 10. The clutch system 10 is shown to include an inner race 14 rotatable around a rotation point 18. The inner race 14 may include a series of notches 22. A first pawl 26 and a second pawl 30 may rotate about first and second pawl pivot points 34, 38 respectively. A housing 40 may also be disposed around the pawls 26, 30. The first and second pawl pivot points 34, 38 may comprise a pin, pawl member or housing member that facilitates pawl 26, 30 rotation around the pawl pivot points 34, 38.

The pawls 26, 30 may rotate between open and locked positions. An open position may allow inner race 14 rotation in a particular direction, while a locked position may not allow inner race 14 rotation in a particular direction due to interference between one of the pawls 26, 30 and the notches 22. Additionally, a first pawl spring 42 may bias the first pawl 26 towards the locked position, and a second pawl spring 46 may bias the second pawl 30 towards the locked position.

More specifically, the first pawl 26 may include a first heel 50 and a first toe 54, and the second pawl 30 may include a second heel 58 and a second toe 62. Each heel 50, 58 may be moved by a component of the clutch system 10 during operation, and each toe 54, 62 may be biased towards the locked position by each respective pawl spring 42, 46. Further, each toe 54, 62 may interfere with the notches 22 in a pawl 26, 30 locked position, thus preventing inner race 14 rotation in a direction.

In addition to the above-mentioned elements, the disclosed clutch system 10 may also include a cam slider 66. The cam slider 66 may slide along an axis and, in doing so, slide a first cam profile 70 and a second cam profile 74. In an embodiment, the cam slider 66 may slide along an axis that is parallel to the axis of rotation of the rotation point 18. A cam slider face 78 may exist on an opposite side of the cam slider 66 relative to the first and second cam profiles 70, 74. An actuator 82, which may include an armature 86, may act upon and impinge upon the cam slider 66 via the cam slider face 78, moving the cam slider 66. The actuator 82 may be a solenoid, or another common actuating device. A cam spring 90 may bias the cam slider 66 towards the actuator 82.

The cam slider 66 may also be disposed around an inner slider 94 and a prevention spring 98. The inner slider 94 may include the first cam profile 70 while the cam slider 66 may include the second cam profile 74. The prevention spring 98 may bias the inner slider 94 away from the cam slider face 78. These components will be discussed further below.

In operation, the sliding motion of the cam slider 66, and associated first and second cam profiles 70, 74 may act upon the heels 50, 58 and rotate the pawls 26, 30. The cam profiles 70, 74 may be shaped in such a manner that their sliding, along with the sliding of the cam slider 66, may rotate the pawls 26, 30. Further, the cam profiles 70, 74 may each rotate a respective pawl 26, 30 when the cam slider 66 is located in a particular position.

Alternatively, one cam profile 70 may rotate a pawl 26 at a particular cam slider 66 position, while the other cam profile 74 may rotate a pawl 30 at another cam slider 66 position. This may be achieved by various cam profile 70, 74 positions or orientations on the cam slider 66. The cam slider 66 may move according to the actuation of the actuator 82, and the actuator 82 may move the cam slider 66 into various positions. In this manner, the position of the actuator 82 may influence the rotation of the pawls 26, 30. As will be described, rotating various permutations of the pawls 26, 30 into open and locked positions enables the clutch system 10 to operate in a plurality of modes.

In an embodiment, three cam slider 66 positions are possible. In the shown embodiment, three different cam slider 66 and actuator 82 positions allow three different pawl 26, 30 rotation combinations due to the cam profiles 70, 74. Each cam slider 66 and actuator 82 position may correspond with a different mode of operation. Further, although shown with three modes of operation, more or fewer than three modes, corresponding to more or fewer than three cam slider 66 and actuator 82 positions are certainly possible, and these embodiments fall within the scope of this disclosure.

Figure 5:
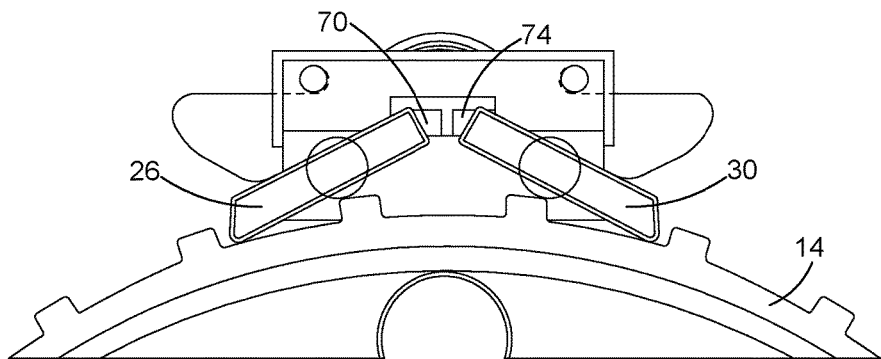
FIG. 5 is a side view of the clutch assembly of FIG. 1 constructed in accordance with the present disclosure.

Turning now to FIG. 5, a first mode of operation is shown. In this mode, both pawls 26, 30 are in locked positions, and each pawl 26, 30 allows inner race 14 rotation in one direction while preventing inner race 14 rotation in the other. In this mode of operation, the inner race 14 is not allowed to rotate in either direction. This mode may be achieved by, and associated with, the cam slider 66 and actuator 82 being in a first position.

Figure 6:
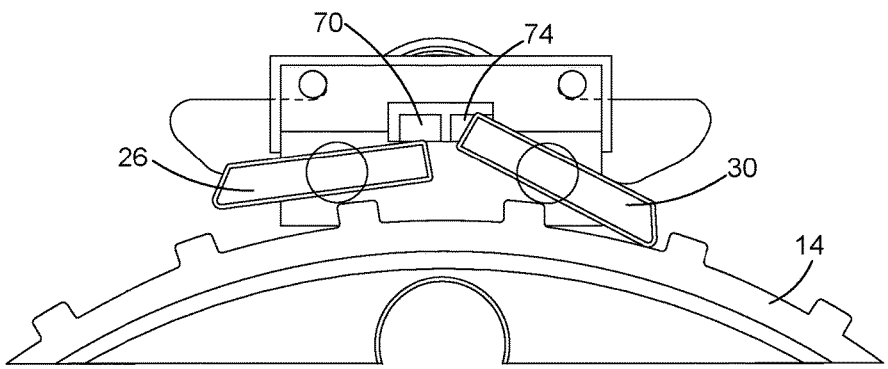
FIG. 6 is a side view of the clutch assembly of FIG. 1, shown in a different mode than that shown in FIG. 1, constructed in accordance with the present disclosure.

A second mode of operation is shown in FIG. 6. In this mode, the first pawl 26 is in an open position, and the second pawl 30 is in a locked position. Accordingly, in this mode of operation, the inner race 14 is allowed to rotate in one direction, but not a second direction. This mode may be achieved by, and associated with, the cam slider 66 and actuator 82 being in a second position.

Figure 7:
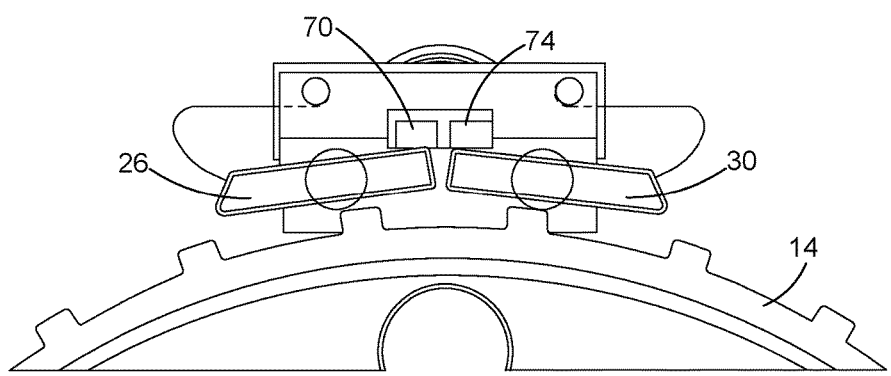
FIG. 7 is a side view of the clutch assembly of FIG. 1, shown in a different mode than that shown in FIG. 1 or 6, constructed in accordance with the present disclosure.

Turning to FIG. 7, a third mode of operation is shown. In this mode, the first pawl 26 is in an open position, and the second pawl 30 is also in an open position. Accordingly, in this mode of operation, the inner race 14 is allowed to rotate in both directions. This mode may be achieved by, and associated with, the cam slider 66 and actuator 82 being in a third position. Although shown in these three positions, other embodiments, including further positions and modes, are certainly possible.

Figure 8:
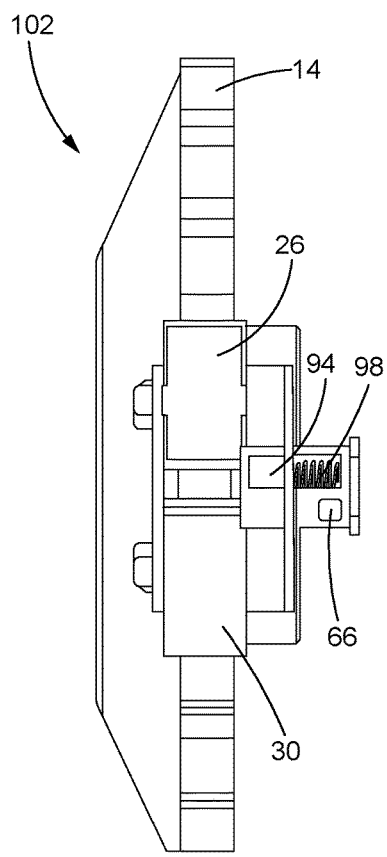
FIG. 8 is a top view of the clutch assembly of FIG. 1, showing a cam slider in a first position, constructed in accordance with the present disclosure.

Further, the disclosed clutch system 10 may include one or more force prevention systems 102. Turning to FIG. 8, such a force prevention system 102 may include the inner slider 94 and the prevention spring 98. A torque may be applied on the inner race 14 by a shaft (not shown) that rotates co-axially with the inner race 14. If a pawl 26 is in the locked position, and the torque is being applied to the inner race 14 against the pawl 26, a force may exist between the pawl 26 and the inner race 14. This force may exceed the capabilities of the actuator 82 or other design elements. In such a situation, the pawl 26 may become pinned in the locked position, as the actuator 82 cannot overcome the force resulting from the applied torque and rotate the pawl 26.

The force prevention system 102 may allow the inner slider 94, which may contain one or more cam profiles 70, 74, to slide towards the prevention spring 98 if the cam profile 70, 74 is unable to rotate the pawl 26. In the shown embodiment, the inner slider 94 includes the first cam profile 70.

Turning to FIG. 8, a first scenario involving such a torque, and resulting force and pinned pawl 26, is shown. The pawl 26 is pinned, but the cam slider 66 has not slid to a position to attempt to rotate the pawls 26, 30 with the cam profiles 70, 74. Accordingly, both pawls 26, 30 may be in the locked position, preventing inner race 14 rotation.

Figure 9:
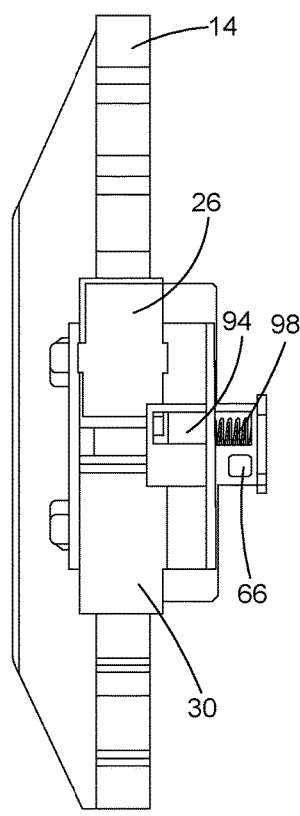
FIG. 9 is a top view of the clutch assembly of FIG. 1, showing a cam slider in a different position from that shown in FIG. 8, constructed in accordance with the present disclosure.
Figure 10:
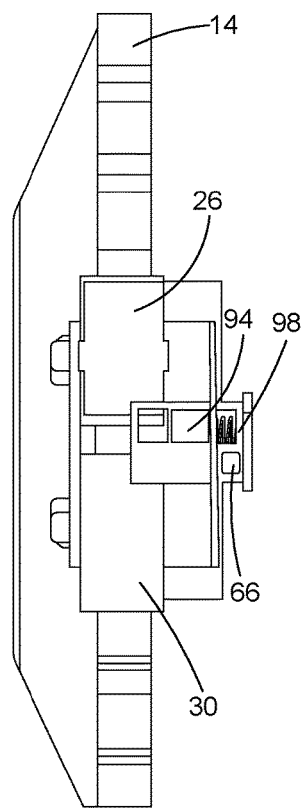
FIG. 10 is a top view of the clutch assembly of FIG. 1, showing a cam slider in a different position from that shown in FIGS. 8 and 9, constructed in accordance with the present disclosure.

Turning to FIG. 9, a second scenario involving such a torque, and resulting force and pinned pawl 26, is shown. The pawl 26 is pinned, but the cam slider 66 has now slid to a position to attempt to rotate the pawls 26, 30 with the cam profiles 70, 74. However, as the force between the pawl 26 and inner race 14 exceeds the abilities of the actuator 82 or other design elements, the inner slider 94 is allowed to slide towards the cam slider face 78 and compress the prevention spring 98. Accordingly, both pawls 26, 30 may be left in the locked position, preventing inner race 14 rotation.

Turning to FIG. 9, a third scenario involving such a torque, and resulting force and pinned pawl 26, is shown. The pawl 26 is pinned, but the cam slider 66 has now slid to a position to attempt to rotate the pawls 26, 30 with the cam profiles 70, 74. However, as the force between the pawl 26 and inner race 14 exceeds the abilities of the actuator 82 or other design facet, the inner slider 94 is allowed to slide further towards the cam slider face 78 and compress the prevention spring 98. Further, in this scenario, even though the inner slider 94 is allowed to slide, the cam slider 66 may now be in a position to rotate the second pawl 30 which is not experiencing any forces resulting from an applied torque. Accordingly, the first pawl 26 may be left in the locked position, preventing inner race 14 rotation in one direction, while the second pawl 30 may be rotated to an open position, allowing inner race 14 rotation in the other direction.

A variety of means may be used to enable the clutch system 10 to achieve multiple operating modes corresponding to different actuator 82 settings. In one embodiment, the multiple operating modes could be achieved by varying the locations of the first or second pawl pivot points 34, 38, or the first and second pawl pivot points 34, 38. Additionally, the shape, orientation or size of the pawls 26, 30 could be configured to enable multi-mode operation. Further, the shape, orientation and relative arrangement of the cam profiles 70, 74 and cam slider 66 may be altered for multi-mode capability. Further, each of the above-mentioned variables may be altered relative to each other to achieve multi-mode ability.

It is to be understood that the foregoing is a description of one or more embodiments of the invention. However, the invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

Figure 11:
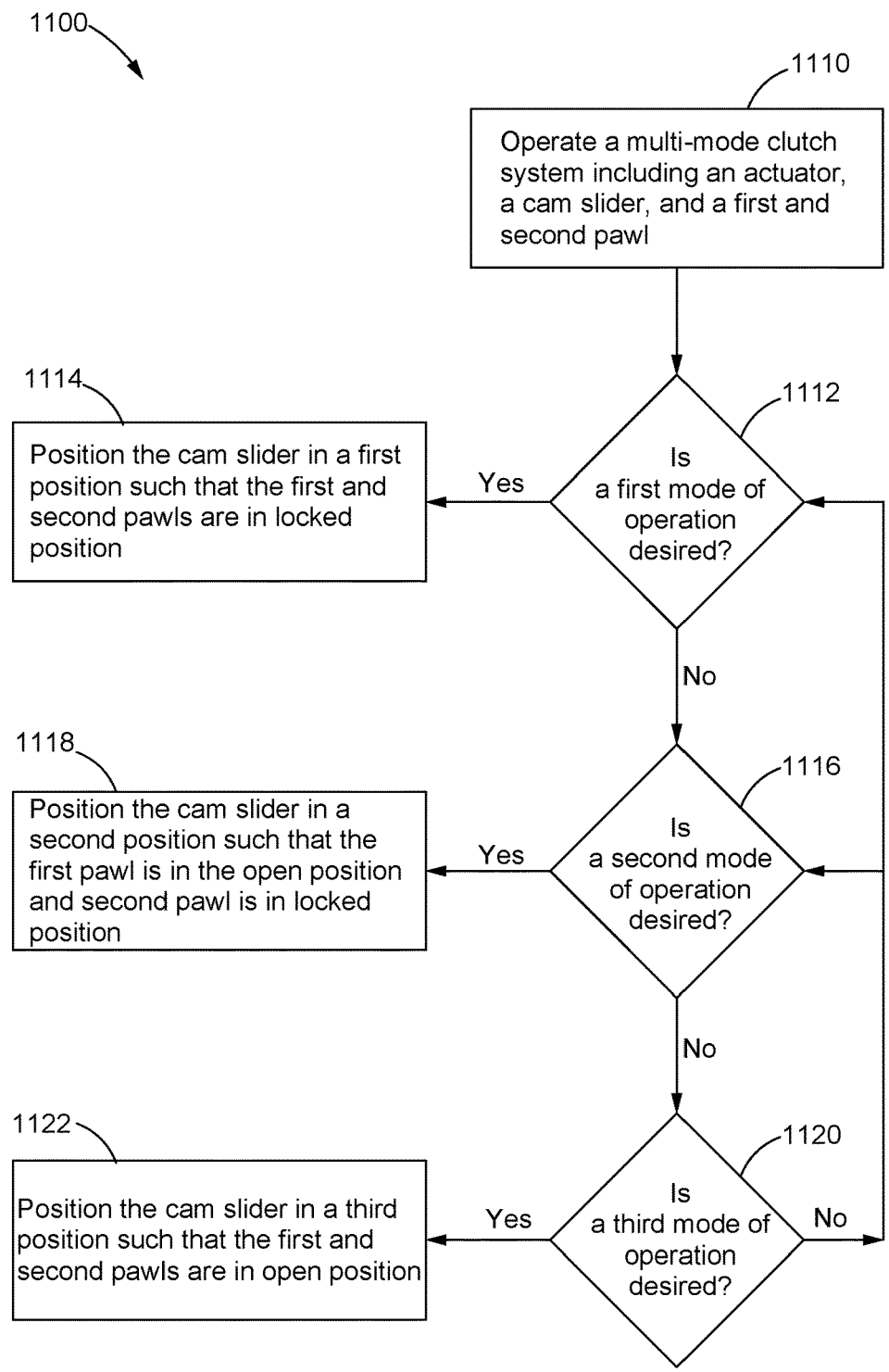
FIG. 11 is a flow chart illustrating an exemplary sequence of steps which may be practiced in accordance with an embodiment of the present disclosure.

FIG. 11 illustrates a flow chart 1100 of a sample sequence of steps which may be performed to operate the multi-mode clutch system 10. Box 1110 illustrates the step of operating the multi-mode clutch system 10 including the actuator 82, the cam slider 66, and the first and second pawls 26, 30. Decision box 1112 illustrates the step of determining whether a first mode of operation is desired. If it is determined that the first mode of operation is desired, then the cam slider 66 is selectively positioned in a first position via the actuator 82 such that the first and second pawls 26, 30 are in locked position with the inner race 14 of the multi-mode clutch system 10, as illustrated in box 1114. If, however, it is determined that the first mode of operation is not desired, then it is determined, at box 1116, whether a second mode of operation is desired and If it is determined that the second mode of operation is desired, then the cam slider is selectively positioned in a second position via the actuator 82 such that the first pawl 26 is in open position with respect to the inner race 14 and the second pawl is in locked position with the inner race 14. If, however, it is determined that the second mode of operation is not desired, then it is determined, at box 1120, whether a third mode of operation is desired. If it is determined that the third mode of operation is desired, then the cam slider 66 is selectively positioned in a third position such that the first and second pawls 26, 30 are in open position with respect to the inner race 14. On the other hand, if it is determine that the third mode of operation is not desired, then it is determined again whether the first or second mode of operations are desired, as illustrated at box 1112 and box 1116, respectively.

What is claimed is:

1. A multi-mode clutch system, comprising:
an actuator;

a cam slider operatively associated with the actuator;
an inner slider operatively associated with the cam slider;
a first cam profile and a second cam profile both operatively associated with the cam slider, wherein the first cam profile is disposed on the inner slider and the second cam profile is disposed on the cam slider; and
a first pawl operatively associated with the first cam profile and a second pawl operatively associated with the second cam profile, wherein:
the first cam profile selectively acts on the first pawl;
the second cam profile selectively acts on the second pawl;
the multi-mode clutch system is configured to allow multiple modes of operation between the first and second pawls and an inner race according to different actuator positions;
the cam slider slides axially relative to the inner race; and
the cam slider is configured to slide independent to the inner slider.

2. The multi-mode clutch system of claim 1, further including a first pawl spring and a second pawl spring, the first pawl spring configured to bias the first pawl into locked position with the inner race, and the second pawl spring configured to bias the second pawl into locked position with the inner race.

3. The multi-mode clutch system of claim 2, further including a cam spring configured to bias the cam slider towards the actuator.

4. The multi-mode clutch system of claim 3, wherein a first mode of operation positions the cam slider into a first position via the actuator such that the first and second pawls are in locked position with the inner race to prevent rotation thereof.

5. The multi-mode clutch system of claim 4, wherein a second mode of operation positions the cam slider into a second position via the actuator such that the first pawl is in open position with respect to the inner race and the second pawl is in locked position with the inner race.

6. The multi-mode clutch system of claim 5, wherein a third mode of operation positions the cam slider into a third position via the actuator such that the first and second pawls are in open position with respect to the inner race.

7. A multi-mode clutch system comprising:
an actuator
a cam slider operatively associated with the actuator;
an inner slider operatively associated with the cam slider;
a prevention spring disposed between the inner slider and the cam slider, the prevention spring configured to be compressed by the inner slider to allow relative movement between the cam slider and the inner slider;
a first cam profile disposed on one of the cam slider and the inner slider;
a second cam profile disposed on the other one of the cam slider and the inner slider;
a first pawl operatively associated with one of the first cam profile and the second cam profile; and
a second pawl operatively associated with the other one of the first cam profile and the second cam profile,
wherein one of the first cam profile and the second cam profile selectively acts on the first pawl, the other one of the first cam profile and the second cam profile selectively acts on the second pawl, and the multi-mode clutch system is configured to allow multiple modes of operation between the first and second pawls and an inner race according to different actuator positions.

8. The multi-mode clutch system of claim 7, wherein the first cam profile is disposed on the inner slider and the second cam profile is disposed on the cam slider.

9. The multi-mode clutch system of claim 8, wherein a first mode of operation positions the cam slider into a first position via the actuator such that the first and second pawls are in locked position with the inner race to prevent rotation thereof.

10. The multi-mode clutch system of claim 9, wherein a second mode of operation positions the cam slider into a second position via the actuator such that the inner slider compresses the prevention spring leaving the first and second pawls in locked position with the inner race.

11. The multi-mode clutch system of claim 10, wherein a third mode of operation positions the cam slider from the second position into a third position via the actuator such that the first pawl remains in locked position with the inner race and the second pawl is in open position with respect to the inner race.

12. The multi-mode clutch system of claim 9, wherein a second mode of operation positions the cam slider into a second position via the actuator such that the first pawl is in open position with respect to the inner race and the second pawl is in locked position with the inner race.

13. The multi-mode clutch system of claim 12, wherein a third mode of operation positions the cam slider into a third position via the actuator such that the first and second pawls are in open position with respect to the inner race.

14. A method of operating a multi-mode clutch system, the method comprising:
operating an actuator, a cam slider, a first pawl, and a second pawl of the multi-mode clutch system;
selectively positioning the cam slider in a first position via the actuator such that the first and the second pawls are in locked position with an inner race of the multi-mode clutch system, the cam slider configured to slide axially relative to the inner race;
selectively positioning the cam slider in a second position via the actuator such that the first pawl is in open position with respect to the inner race and the second pawl is in locked position with the inner race;
selectively positioning the cam slider in a third position via the actuator such that the first and second pawls are in open position with respect to the inner race; and
operating a prevention spring disposed between an inner slider and the cam slider, the prevention spring configured to be compressed by the inner slider to allow relative movement between the cam slider and the inner slider.

* * * * *